April 28, 1931. E. HOLEK 1,802,816
GAS PRESSURE REGULATING DEVICE FOR FIREARMS
Filed June 18, 1929
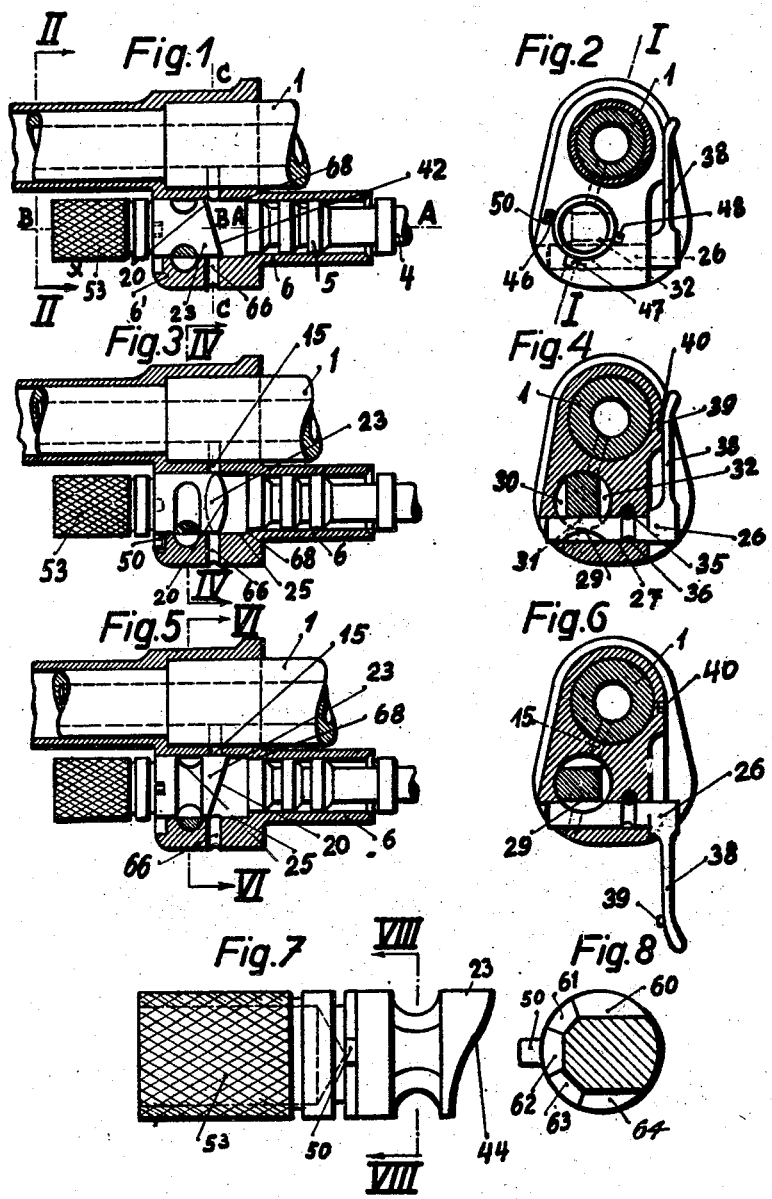
Emanuel Holek
INVENTOR
BY 
his ATTORNEY Patented Apr. 28, 1931

1,802,816

UNITED STATES PATENT OFFICE

EMANUEL HOLEK, OF BRUNN, CZECHOSLOVAKIA, ASSIGNOR TO THE FIRM CESKOSLOVENSKA ZBROJOVKA AKCIOVA SPOLECNOST V BRNE, OF BRUNN, CZECHOSLOVAKIA

GAS-PRESSURE-REGULATING DEVICE FOR FIREARMS

Application filed June 18, 1929, Serial No. 371,787, and in Czechoslovakia May 6, 1929.

This invention relates to devices for regulating the pressure in the gas-cylinders of gas-pressure operated automatic fire-arms. Essentially my invention consists in providing within the connecting channel intermediate the barrel and the gas-cylinder of the fire-arm a regulating organ of very simple construction permitting to quickly, exactly and reliably adjust the gas-pressure. In addition to this, my new regulating organ is of especial construction to prevent as safely as possible any soiling or choking and to permit easy assembling and taking apart of the several parts of the regulating organ.

According to my invention the afore-mentioned features are attained essentially by arranging the regulating organ within the connecting channel intermediate the barrel and the gas-cylinder of the fire-arm so as to be rotatable around an axis which is parallel to the axis of the gas-cylinder. According to my invention the regulating organ is further equipped with a regulating edge co-operating with the connecting channel at its orifice towards the gas-pressure cylinder.

An example of the construction of the novel regulating organ for the pressure in the gas-cylinders of gas-pressure operated automatic fire-arms is shown in the accompanying drawing of which Fig. 1 is a longitudinal section through a fire-arm constructed according to my invention along line I—I of Fig. 2, the regulating organ being shown in fully open condition, Fig. 2, a cross-section along line II—II of Fig. 1 as seen in a direction from the left towards the right, Fig. 3 a longitudinal section of the regulating organ in partly closed condition, Fig. 4 a section along line IV—IV of Fig. 3 as seen from the left towards the right, Fig. 5 another longitudinal section showing the regulating organ in position to fully close up the connecting channel between the barrel and the gas-pressure cylinder, Figs. 6 a section along line VI—VI of Fig. 5, while Figs. 7 and 8 show further modified forms of the regulating organ according to this invention in a view and in a section according to line VIII—VIII of Fig. 7, respectively.

Referring now more particularly to the drawing, the barrel 1 of the fire-arm comprises a piston-rod 4, a gas-pressure piston 5 and a gas-cylinder 6. The connecting channel intermediate the barrel 1 and the gas-cylinder 6 is shown at 15, while the regulating organ which serves for regulating the pressure in said gas-cylinder is designated with $x$. This regulating organ $x$ according to my present invention is mounted rotatably around an axis B—B which is generally positioned parallelly to the axis A—A of the gas-cylinder. More particularly in the example of construction shown in the drawing the axis of rotation B—B coincides with the axis A—A of the gas-cylinder 6. The regulating organ $x$ is equipped with a regulating edge 20 which is inclined at an angle towards the plane of rotation C—C of the regulating organ. This regulating edge 20 during rotation of the regulating organ $x$ will co-operate with the connecting channel 15 at its orifice towards the gas-cylinder in a manner to properly adjust the gas-pressure in such a manner that said passage may either be fully open—which corresponds to full gas-pressure—or more or less choked which corresponds to a smaller gas-pressure. Also said passage may be fully closed so that no connection at all will be present between the barrel and the gas-cylinder.

In the example shown in the drawing the regulating organ consists of a plug 23 which is mounted rotatably in the front part 6' of the gas-pressure cylinders 6, to more or less close up said gas-pressure cylinder towards its front. The regulating plug 23 is fixed in its regulating positions and may be secured against displacement by special fixing and securing means. This fixing and securing means consists in the first place of a bolt 26 extending partly through the bore 25 which serves as a bearing for the regulating plug 23. This bolt is mounted rotatably in a further transverse bore 27 as shown in the drawing and provided with a recess 29 which permits rotation and displacement of the regulating plug 23 in the position of the bolt shown in Fig. 6. The bolt 26 which acts as fixing and adjusting bolt co-operates with recesses 30 and 32 which recesses are provided one in the rear of the other on the periphery of said regulating plug in a manner to form a groove therein. A pin 35 engages with a recess in the bolt 26 to secure said bolt in position, when inserted, and to serve as a guide for said bolt during rotation. The bolt 26 is provided with a resilient arm 38 carrying a nose or pawl which may be brought into engagement with a notch 40.

In order to fix the regulating plug 23 there are further provided notches 46, 47 and 48 in the front surface of the extension 6', said notches being adapted to engage with a pin 50 provided on the regulating plug 23. The notches 46, 47 and 48 are arranged relatively to each other in exactly the same positions as the recesses 30, 31 and 32 on the regulating plug 23. In the construction shown in Figs. 1–6 the recesses 30, 31 and 32 as well as the notches 46, 47 and 48 are displaced with respect to each other by 90 degrees.

A regulating edge 20 is obtained in the constructions according to Figs. 1–6 by obliquely arranging the front surface of the regulating plug 23 which front surface is directed towards the gas-cylinder 6. In the constructions shown in Figs. 7 and 8 the regulating edge is obtained by giving a helical form to the front surface 44 of the regulating plug 23. A handle 53 is provided in order to facilitate manipulation of the regulating plug 23.

If it is assumed that the regulating plug 23 is in regulating position as shown in Figs. 1 and 2, the barrel 1 will be connected with the gas-pressure cylinder 6 by means of the channel 15 therebetween which channel is in fully open condition. The bolt 26 now engages with the recess 3, while the pin 50 is in engagement with the notch 46. In this manner the regulating plug 23 will be safely kept in regulating position and even in case of heavy vibrations said regulating plug will be positively prevented against becoming loose and against unintended displacement.

If, for instance, the channel 15 shall be partially closed up as shown in Figs. 3 and 4 for the purpose of reducing the gas-pressure in the gas-cylinder 6, it will at first be necessary to swing the arm 38 towards the side, thus moving the pin 39 out of the notch 40. Now the bolt 26 is rotated by means of the lever 48 to such an extent until the recess 29 comes within the range of action of the regulating plug 23, as shown in Figs. 5 and 6. The regulating plug 23 now is slightly drawn out so that the pin 50 comes out of engagement with the notch 46 and thereupon the plug 23 is rotated into the position shown in Figs. 3 and 4 and finally fixed in this position. Locking of the regulating plug 23 is accomplished by again moving the same in inward direction so that the locking pin 50 engages with the notch 47. Thereupon the locking bolt 26 is rotated backward and the regulating plug is thus locked in a position which effects partial closing or choking of the channel 15.

If it is desired to move the regulating plug 23 into position to fully close up the channel 15, the manipulations have to be made in an exactly analogous way. The regulating plug 23 in unlocked condition must be rotated into the position shown in Figs. 5 and 6 in which position the pin 50 engages with the notch 48. In the position according to Figs. 5 and 6 the channel 15 will be completely closed, the gas-piston in this condition of the fire-arm being now entirely inoperative. This may, for instance, be utilized to advantage in case an automatic operation of the fire-arm is not desired, for instance, if troubles arise at the retracting spring, at the head of the gas-piston or the like. In such cases the fire-arm may be cocked by hand and used as a non-automatic repeating gun.

By properly arranging the locking means which consists of the recesses of the regulating plug 23 and the stops in the front wall of the front and of the gas-cylinder a gradual closing of the channel 15 and therewith a gradual choking of the passage for the gas may be attained. An example of a construction of this kind is shown in Figs. 6, 7 and 8, according to which the regulating plug is provided with five recesses 60, 61, 62 and 63 which are displaced relatively to each other by angles of 45 degrees.

As indicated in Figs. 1, 3 and 5, there is provided an aperture 66 diametrically opposite to the connecting channel 15 which aperture is normally closed by the regulating plug. This aperture 66 serves to permit easy cleaning of the channel 15. In closed condition of the channel 15, as shown in Figs. 5 and 6, the aperture 66 is open and the gas-cylinder in connection with the outer air. It is noted that no air pad can be formed which could obstruct motion of the gas-piston.

As shown in Figs. 1, 3 and 5, the diameter of the bore 25 which forms a bearing for the regulating plug 23 is somewhat larger than the diameter of the gas-pressure cylinder 6. In this manner there will be formed a ring-shaped edge 68 intermediate the bore 25 and the gas-pressure cylinder 6, said edge co-operating with the gas-piston to form a scraping device preventing deposition of foreign matter upon the gas-piston 5.

The regulating device according to my invention will permit in a simple and very effective manner the gas-pressure to be adjusted in accordance with the temporary condition of the fire-arm. In new condition of the barrel which in this case is not provided with a lubricating substance or in dry or soiled condition of the barrel large frictional forces will have to be overcome and therefore a more effective opening of the channel 15 will be necessary. In this case, therefore, the channel is not being choked. On the other hand, in case of well lubricated gas-pressure operated automatic fire-arms a choking of the gas will be desirable, because in this condition the fire-arm requires a smaller force for being operated. If no such choking is used in this case, the parts of the fire-arm would greatly suffer and be subject to excessive wear. A choking of the gas supply now is also made use of in case the barrel is old or in worn-out condition. Since the wear of the barrel decreases towards its orifice, highly compressed gas will pass into the gas-cylinder which gas will act exceedingly hard upon the gas-piston. For this reason a choking of the gas supply is resorted to.

A further advantage of the present regulating device consists therein that the several parts of the device may be very easily cleaned after removing the regulating organ. In addition to this the gas-cylinder will be freely accessible and may also be easily cleaned by the cleaning stick.

I claim:

1. In a fire-arm, the combination of a barrel, with a gas-pressure cylinder connected with said barrel by means of a passage, a regulating device provided in said cylinder for regulating the pressure in said gas-cylinder, said regulating device being arranged rotatably around an axis which is parallel to the axis of said gas-pressure cylinder and having a regulating edge at an angle to the axis of rotation of said regulating device, said regulating edge being in operative relation with the orifice of said cylinder.

2. A regulating device for gas-pressure operated automatic fire-arms which are provided with a barrel, a gas-pressure cylinder, a passage intermediate said barrel and said gas-pressure cylinder, said device consisting of a regulating organ mounted within said cylinder rotatably around an axis parallel to the axis of said gas-pressure cylinder, a regulating edge provided on said regulating organ, said regulating edge being positioned at an angle to the axis of rotation of said regulating organ and adapted to co-operate with the orifice of said passage to provide a choking means for the latter.

3. The combination as specified by claim 1 in which the regulating device is provided at the side directed towards the gas-pressure cylinder with an obliquely positioned surface.

4. A device as specified by claim 2 in which the regulating organ is provided at the side directed towards the gas-pressure cylinder with a helically formed front surface.

5. A device as specified by claim 2 in which the regulating organ consists of a plug mounted rotatably at the front end of the gas-cylinder, and having fixing means for fixing said plug in various regulating positions.

6. A regulating device as specified by claim 2 comprising fixing means for fixing the regulating organ in various operating positions, said fixing means consisting of a bolt which passes partly through a bore forming a bearing surface for said regulating organ, a recess on said bolt, and recesses on said regulating organ adapted to co-operate with said recess on said bolt.

7. A regulating device as specified by claim 2 comprising fixing means for fixing the regulating organ in various operating positions, said fixing means consisting of a bolt which passes partly through a bore forming a bearing surface for said regulating organ, a recess on said bolt, recesses on said regulating organ adapted to cooperate with said recess on said bolt, said recesses on said regulating organ being arranged one in the rear of the other on the periphery of the regulating organ so as to form a groove adapted to engage with said fixing means.

8. A regulating device as specified by claim 2, comprising fixing means for fixing the regulating organ in various operating positions, said fixing means consisting of a bolt mounted rotatably in a transverse bore provided in the gas-cylinder head, a recess on said bolt, and recesses on said regulating organ to cooperate with said recess on said bolt.

9. A regulating device as specified by claim 2 comprising the fixing means for fixing the regulating organ in various operating positions, comprising a bolt passing partly through a bore adapted to serve as a bearing for said regulating organ, said bolt being provided with a cut-away portion adapted to co-operate with recesses provided on said regulating organ.

10. A regulating device as specified by claim 2 comprising fixing means for fixing the regulating organ in various operating positions, said fixing means consisting of a bolt passing through a bore forming a bearing surface for said regulating organ, a recess on said bolt, and recesses on said regulating organ adapted to cooperate with said recess on said bolt, said fixing means consisting further of an extension provided at the regulating organ and of notches arranged at the front surface of the gas-cylinder.

11. A device specified by claim 1 in which the gas-cylinder is provided with an aperture provided diametrically opposite to the channel, said aperture being adapted to be controlled by the regulating device.

12. A gas pressure self loading gun, comprising in combination a gun barrel, a pressure cylinder in communication with said barrel through a passage, and a valve regulator adjustable in said cylinder and truncated at its end to cut off the opening into the passage at an acute angle with respect to the longitudinal axes of the barrel and cylinder.

13. A gas pressure self loading gun, as claimed in claim 12, in which the truncated end of the valve is formed in an ogee curve.

14. A gas pressure self loading gun, as claimed in claim 12, in which the pressure cylinder is provided with a transverse opening at one end to register with a correspondingly disposed groove in the periphery of the valve regulator, and means mounted in the bore formed by the opening in the cylinder and groove in the regulator to lock the latter against longitudinal or rotary adjustment.

15. A gas pressure self loading gun, as claimed in claim 12, in which the pressure cylinder is provided with a transverse opening at one end to register with a correspondingly disposed polysided groove in the periphery of the valve regulator, and means mounted in the bore formed by the opening in the cylinder and the groove in the regulator to lock the latter in against longitudinal and rotary movement in any position corresponding to any of the sides of said groove.

16. A gas pressure self loading gun, as claimed in claim 12, in which the pressure cylinder is provided with a transverse opening adjacent one end, and the valve regulator comprises a plug having a peripheral groove registering with the opening in the cylinder, said groove having a polysided wall, any side of which is alinable with said opening in the cylinder, and a crank rotatably mounted in said opening and groove to fix the plug in adjusted rotary position.

17. A gas pressure self loading gun, as claimed in claim 12, in which the pressure cylinder is provided with a transverse opening adjacent one end, and the valve regulator comprises a plug having a peripheral groove registering with the opening in the cylinder, said groove having a polysided wall, any side of which is alinable with said opening in the cylinder, and a crank rotatably mounted in said opening and groove to fix the plug in adjusted rotary position, said crank having a groove to register with the bore cylinder to form a complete opening in which the valve may be rotated.

18. A gas pressure self loading gun, as claimed in claim 12, in which the pressure cylinder is provided with a transverse opening adjacent one end, and the valve regulator comprises a plug having a peripheral groove registering with the opening in the cylinder, said groove having a polysided wall, any side of which is alinable with said opening in the cylinder, and a crank rotatably mounted in said opening and groove to fix the plug in adjusted rotary position, said plug being provided with a radial projection and face of the cylinder with notches to receive the projection to fix the position of the plug.

19. A gas pressure self loading gun, as claimed in claim 12, in which the pressure cylinder is provided with a transverse opening adjacent one end, and the valve regulator comprises a plug having a peripheral groove registering with the opening in the cylinder, said groove having a polysided wall, any side of which is alinable with said opening in the cylinder, and a crank rotatably mounted in said opening and groove to fix the plug in adjusted rotary position, said cylinder being provided with an opening diametrically opposite to the passage into the barriel, said opening being opened and closed by rotary adjustment of the valve plug.

In testimony whereof I affix my signature.

EMANUEL HOLEK.